US010676113B2

(12) United States Patent
Huck et al.

(10) Patent No.: US 10,676,113 B2
(45) Date of Patent: Jun. 9, 2020

(54) PROJECTED MAGNETIC FASTENING SYSTEM

(71) Applicant: Trinity Industries, Inc., Dallas, TX (US)

(72) Inventors: Kenneth W. Huck, Fairview, TX (US); Jonathan P. Aukes, Sherman, TX (US)

(73) Assignee: Trinity Industries, Inc., Dallas, TX (US)

( * ) Notice: Subject to any disclaimer, the term of this patent is extended or adjusted under 35 U.S.C. 154(b) by 397 days.

(21) Appl. No.: 15/664,973

(22) Filed: Jul. 31, 2017

(65) Prior Publication Data

US 2018/0029618 A1    Feb. 1, 2018

Related U.S. Application Data

(60) Provisional application No. 62/369,594, filed on Aug. 1, 2016.

(51) Int. Cl.
*B61F 11/00* (2006.01)
*B61D 3/18* (2006.01)
(Continued)

(52) U.S. Cl.
CPC ............. *B61F 11/00* (2013.01); *B60L 13/006* (2013.01); *B60L 13/06* (2013.01); *B61D 3/18* (2013.01);
(Continued)

(58) Field of Classification Search
CPC ....... B60R 13/04; B60R 13/043; B60R 19/44; B60R 19/445; B60R 19/42; B61F 11/00;
(Continued)

(56) References Cited

U.S. PATENT DOCUMENTS

| 435,040 A | * | 8/1890 | Kinsey | A61C 13/16 |
| | | | | 164/238 |
| 3,734,553 A | * | 5/1973 | Sugasawara | E05C 17/56 |
| | | | | 292/251.5 |

(Continued)

OTHER PUBLICATIONS

Janecek, M., "Reflectivity Spectra for Commonly Used Reflectors," Lawrence Berkeley National Laboratory, https://escholarship.org/us/item/75v88cf, publication date: Apr. 21, 2014, 10 pages.

*Primary Examiner* — Jason C Smith
(74) *Attorney, Agent, or Firm* — Baker Botts, LLP

(57) ABSTRACT

According to some embodiments, a railcar comprises an interior wall and guard strips magnetically coupled to the interior wall. Each of the guard strips comprises a cushioning material for absorbing impact. The guard strips are configured to prevent an object loaded in the railcar from contacting the interior wall. The railcar further comprises protected magnetic fastening systems coupling each of the guard strips to the interior wall. Each of the protected magnetic fastening systems comprises a magnet and a rod comprising a first end and a second end. The first end is coupled to the magnet, and the second end extends through the guard strip. The protected magnetic fastening system may further comprise a cup washer coupled to the second end of the rod and secured with a fastener. The cup washer partially surrounds the fastener to restrict objects larger than the cup washer from contacting the fastener.

5 Claims, 6 Drawing Sheets

(51) Int. Cl.
*B60L 13/00* (2006.01)
*B60L 13/06* (2006.01)
*B61F 9/00* (2006.01)
*E01B 25/30* (2006.01)

(52) U.S. Cl.
CPC .......... *B61F 9/005* (2013.01); *B60L 2200/26* (2013.01); *E01B 25/305* (2013.01)

(58) Field of Classification Search
CPC ........ B61F 9/005; B60L 13/006; B60L 13/06; B61D 3/18
See application file for complete search history.

(56) References Cited

U.S. PATENT DOCUMENTS

| | | | | |
|---|---|---|---|---|
| 4,014,583 | A * | 3/1977 | Forbes | B60R 13/04 |
| | | | | 293/128 |
| 4,810,015 | A * | 3/1989 | McNeil | B60J 11/06 |
| | | | | 150/166 |
| 4,849,272 | A * | 7/1989 | Haney | B25H 5/00 |
| | | | | 428/102 |
| 5,060,994 | A * | 10/1991 | Martin | B60R 13/04 |
| | | | | 267/140 |
| 5,129,695 | A * | 7/1992 | Norman, II | B60J 11/06 |
| | | | | 280/770 |
| 6,561,740 | B1 * | 5/2003 | Burke | B60P 3/08 |
| | | | | 410/117 |
| 10,435,040 | B2 * | 10/2019 | Huck | B61D 3/04 |
| 2010/0276951 | A1 * | 11/2010 | Malina | B60R 19/44 |
| | | | | 293/142 |
| 2015/0291182 | A1 * | 10/2015 | Stiles | B61D 45/008 |
| | | | | 105/355 |
| 2018/0029618 | A1 * | 2/2018 | Huck | B60L 13/006 |

* cited by examiner

PROJECTED MAGNETIC FASTENING SYSTEM

RELATED APPLICATIONS

This application claims priority to U.S. Provisional Application Ser. No. 62/369,594, entitled "PROTECTED MAGNETIC FASTENING SYSTEM," filed Aug. 1, 2016.

TECHNICAL FIELD

This disclosure relates generally to a protected magnetic fastening system, and more particularly to a protected magnetic fastening system for fastening door edge guards in an autorack railcar.

BACKGROUND

An autorack railcar (also referred to as an auto carrier or car transporter) is a railcar for transporting automobiles and light trucks. For example, an autorack railcar may transport vehicles from a manufacturing facility to a distributorship, or transport vehicles for passengers of a passenger train service.

Existing autorack railcars may be configured with one deck (Uni-level), two decks (Bi-level), or three decks (Tri-level). Some existing autorack railcars are convertible from two decks to three decks or from three decks to two decks. Conversions may be performed to accommodate different sized vehicles, such as taller vehicles that may not fit on a Tri-level autorack railcar.

To load an autorack railcar, a skilled driver drives the vehicle up a ramp and onto one of the decks. The driver or another crew member then secures the vehicle to the deck with tie down straps, chains, etc. The process is reversed to unload the autorack railcar.

Autorack railcars may include cushioning strips along their interior walls. The cushioning strips may prevent parts of the vehicles, such as vehicle doors, from contacting the interior walls of the autorack railcar as an operator loads or unloads the vehicles. The cushioning strips may be referred to as door edge guards because they protect the edges of the vehicle doors.

SUMMARY

According to some embodiments, a railcar comprises an interior wall and one or more guard strips magnetically coupled to the interior wall and extending towards an interior of the railcar. Each of the one or more guard strips comprises a cushioning material for absorbing impact. The one or more guard strips are configured to prevent an object loaded in the railcar from contacting the interior wall of the railcar. The railcar further comprises one or more protected magnetic fastening systems coupling each of the one or more guard strips to the interior wall. Each of the one or more protected magnetic fastening systems comprises a magnet and a rod comprising a first end and a second end. The first end is coupled to the magnet, and the second end extends through the guard strip. The protected magnetic fastening system may further comprise a cup washer coupled to the second end of the rod and secured with a fastener. The cup washer partially surrounds the fastener to restrict objects larger than the cup washer from contacting the fastener.

In particular embodiments, the rod comprises a threaded rod, the fastener comprises a nut, and the cup washer comprises a plastic cup washer. The one or more guard strips may comprise a recessed portion and the one or more protected magnetic fastening systems may be disposed within the recessed portion. The railcar may comprise an autorack railcar and the object may comprise a vehicle door.

According to some embodiments, a magnetic fastening system for use with a railcar comprises a magnet and a rod comprising a first end and a second end. The first end of the rod is coupled to the magnet. The magnetic fastening system further comprises a cup washer coupled to the second end of the rod and secured with a fastener. The cup washer partially surrounds the fastener to restrict objects larger than the cup washer from contacting the fastener.

In particular embodiments, the rod comprises a threaded rod, the fastener comprises a nut, and the cup washer comprises a plastic cup washer. When the rod is extended through an object, the magnet and the rod are configured to magnetically couple the object to an interior wall of a railcar.

According to some embodiments, a door edge guard comprises a guard strip comprising a cushioning material for absorbing impact and one or more protected magnetic fastening systems. Each of the one or more protected magnetic fastening systems comprises a magnet and a rod comprising a first end and a second end. The first end is coupled to the magnet, and the second end extends through the guard strip. The door edge guard may further comprise a cup washer coupled to the second end of the rod and secured with a fastener. The cup washer partially surrounds the fastener to restrict objects larger than the cup washer from contacting the fastener.

In particular embodiments, the rod comprises a threaded rod, the fastener comprises a nut, and the cup washer comprises a plastic cup washer. The guard strip may comprise a recessed portion, and the one or more protected magnetic fastening systems are disposed within the recessed portion. When the door edge guard is coupled to an interior of an autorack railcar, the door edge guard restricts a door of a vehicle loaded in the autorack railcar from contacting the interior of the autorack railcar when the door is opened.

According to some embodiments, a method of repositioning a door edge guard on the interior of a railcar comprises uncoupling a door edge guard magnetically coupled to a first position on an interior wall of the railcar. The door edge guard comprises a guard strip comprising a cushioning material for absorbing impact and one or more protected magnetic fastening systems. Each one of the one or more protected magnetic fastening systems comprises a magnet, and a rod comprising a first end and a second end. The first end is coupled to the magnet, and the second end extends through the guard strip. The protected magnetic fastening system may further comprise a cup washer coupled to the second end of the rod and secured with a fastener. The cup washer partially surrounds the fastener to restrict objects larger than the cup washer from contacting the fastener. The method further comprises magnetically coupling the door edge guard to a second position on the interior wall of the railcar.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
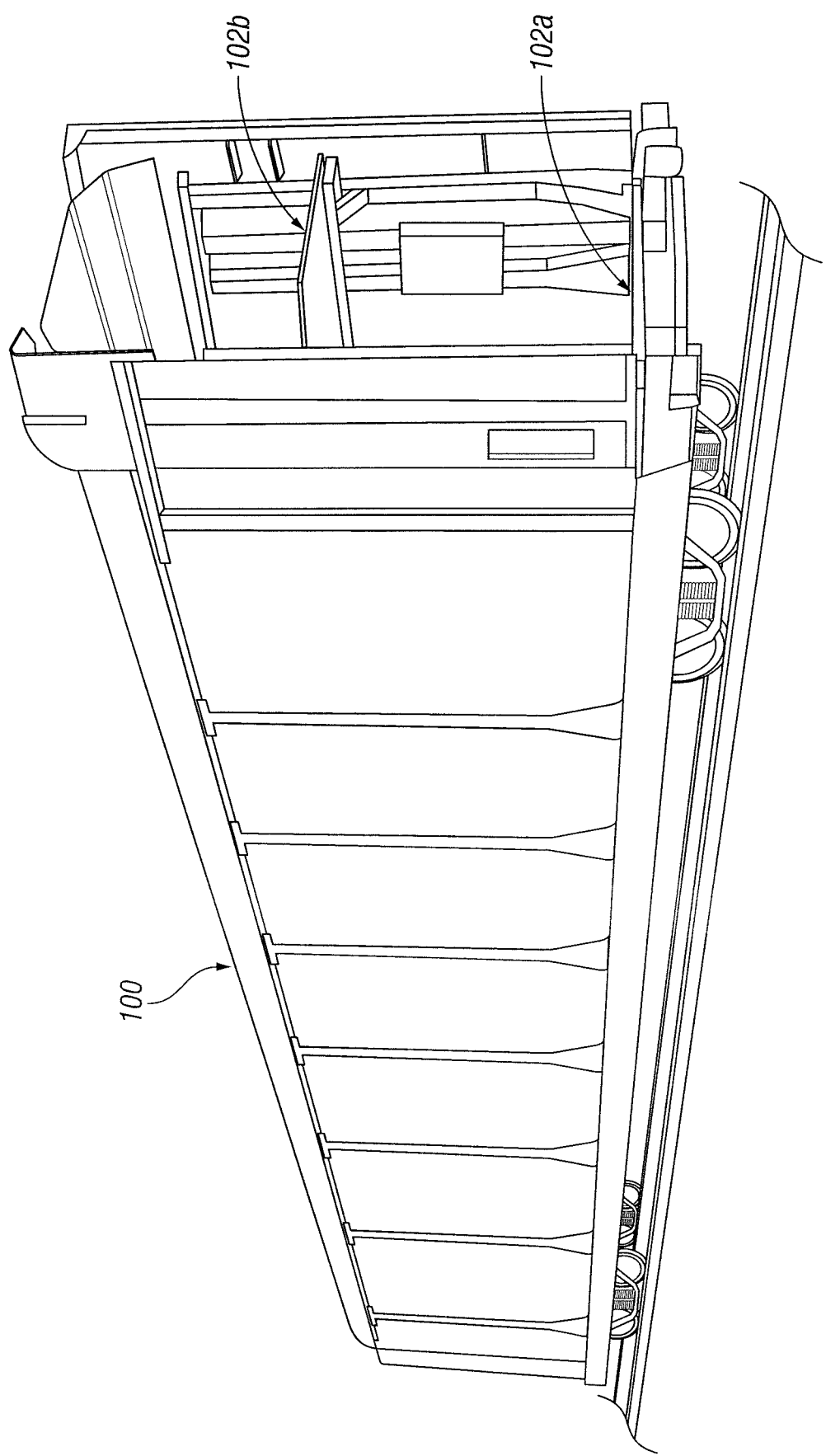
FIG. 1 illustrates an end view of an example autorack railcar.

Autorack railcars are configured to store and transport automobiles and/or vehicles (e.g., cars, trucks, motorcycles, etc.). Protective strips or door edge guards attach to the inside of an autorack railcar at the door level and protect vehicles loaded into an autorack railcar from hitting and/or scratching against an interior surface of the autorack railcar.

Existing door edge guards are permanently or semi-permanently attached to the inside of the autorack railcar using various fasteners such as plastic expanding fasteners that protrude through holes in the autorack side sheets. These fasteners, however, may only allow for a finite number of predetermined locations for the door edge guards. Furthermore, attaching the door edge guards to the inside of the autorack railcar may require numerous fasteners along the length of both sides of the autorack railcar (which may be eighty feet or more in length), and for each deck in the autorack railcar. These fasteners may not be reusable, and therefore, may need to be replaced when the door edge guards are relocated.

As a particular example, the plastic expanding fasteners used to connect door edge guards to the interior of the autorack may comprise large plastic push rivets. These rivets are not only hard to install, but they are also difficult to remove. To remove the rivets, an operator may have to use a hammer to pound the rivet out from the outside of the autorack, which can be difficult to reach. If the door edge guard needs to be moved, the plastic rivets need to be removed, the guard repositioned, and new plastic rivets used to reattach it. The old rivets are not reusable, which adds expense.

Generally, when parts or components are attached near other objects that may come into contact with fasteners used for attaching the parts or components, the fasteners need to be protected to prevent damage between contact objects, or the fasteners need to be made of materials that prevent damage. As an example, autorack railcars may include door edge guards attached to the wall of the autorack railcar to prevent damage to vehicle doors when the vehicle door is opened while the vehicle is loaded on the autorack railcar. A door edge guard comprises a soft material that prevents the vehicle door from contacting the steel wall of the autorack railcar. If the fasteners used to attach the door edge guard to the autorack railcar wall are not protected, then a fastener may damage a vehicle door if the vehicle door contacts one of the fasteners.

Particular embodiments obviate this problem and provide a protected magnetic fastening system. The fastening system facilitates objects to be easily removed and/or relocated by simply pulling on them to disengage the magnet from the mounting surface and can be easily reinstalled by placing the fastening system back in the vicinity of a metal structure. Particular embodiments include a protected magnetic fastening system for fastening door edge guards in an autorack railcar. Although particular embodiments are described with respect to an autorack railcar, other embodiments include other types of railcars, other types of vehicles (e.g., barges, trucks, etc.) or other types of containers (e.g., intermodal shipping containers). An example autorack railcar is illustrated in FIG. 1.

FIG. 1 illustrates an end view of an example autorack railcar 100. Vehicles are loaded into autorack railcar 100 and transported by railway to their destination. Existing autorack railcars 100 may contain decks at different heights on which vehicles can be stored. By using these decks, more vehicles can be loaded into autorack railcar 100. In the illustrated embodiment of FIG. 1, autorack railcar 100 includes two decks 102a and 102b.

In particular embodiments, autorack railcar 100 may include any number of decks (e.g., three or more decks). The decks of an autorack railcar may be referred to as an A-deck, a B-deck, a C-deck, and so forth based on their position with the autorack railcar. The floor or lowest level of the autorack railcar is referred to as the A-deck (labeled 102a in FIG. 1). The level or deck above the A-deck is the B-deck (labeled 102b in FIG. 1). The level or deck above the B-deck is the C-deck, and so forth.

When vehicles are loaded and/or transported in autorack railcar 100, the vehicles may contact the interior side walls of autorack railcar 100 causing damage to the vehicle. Existing autorack railcars may include door guards coupled to an interior side wall of the autorack railcar. These door guards protect the vehicles inside the autorack railcar from getting damaged by collisions with the side wall of the autorack railcar. Once positioned, however, these door guards are difficult to remove and/or adjust to accommodate different types of vehicles.

An autorack railcar may be configured or reconfigured for different vehicles by adjusting the vertical position of decks within the autorack railcar, by converting the autorack railcar between a Tri-level configuration and a Bi-level configuration, by increasing the overall height of the autorack railcar, and/or a combination of these methods. Particular embodiments may include magnetically coupled door edge guards which are easily movable to support various configurations of the autorack railcar and various vehicle types loaded in the autorack railcar. An example is illustrated in FIG. 2.

Figure 2:
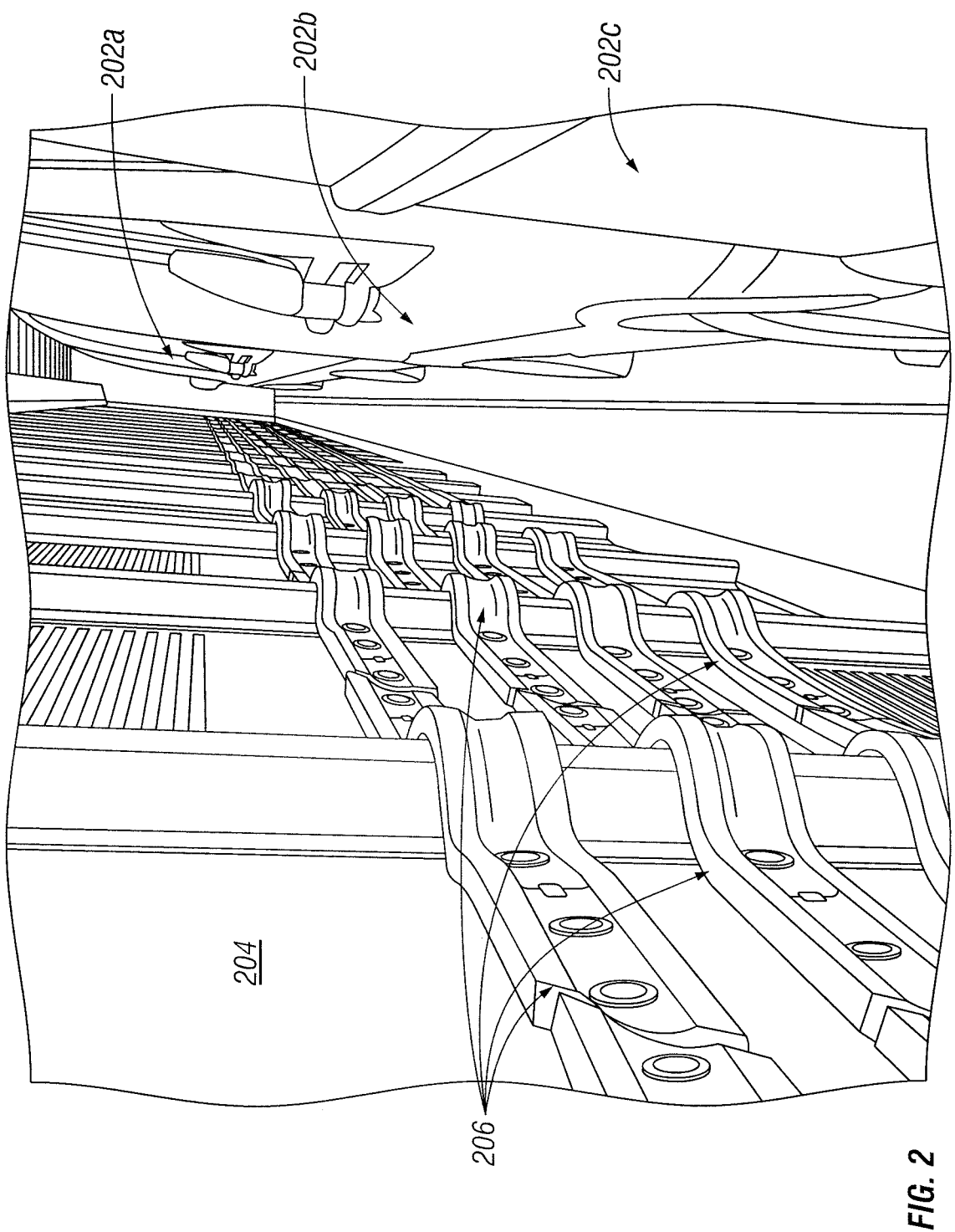
FIG. 2 illustrates an interior of an example autorack railcar with magnetically coupled door edge guards, according to a particular embodiment.

FIG. 2 illustrates an interior of an example autorack railcar with magnetically coupled door edge guards, according to a particular embodiment. The interior of the example autorack railcar, such as autorack railcar 100 described with respect to FIG. 1, includes interior wall 204 and door edge guards 206. Vehicles 202a, 202b, and 202c are loaded in autorack railcar 100.

In particular embodiments, door edge guards 206 are repositionable within the interior of autorack railcar 100 to protect vehicles 202 inside the railcar from damage caused by collisions with the side walls of railcar 100 (e.g., striking an edge of a door of vehicle 202 on interior wall 204 when opening the door during loading and unloading of autorack railcar 100). Door edge guards 206 include a magnetic coupling to the autorack railcar which facilitates an operator quickly and easily repositioning door edge guards 206 anywhere inside of autorack railcar 100. Door edge guards 206 may provide easy adjustability to any height.

In some embodiments, door edge guard 206 may span the length of railcar 100 (e.g., 80 feet). In some embodiments, multiple door edge guards 206 may be arranged end to end to span the length of railcar 100 or a portion of the length of railcar 100. Multiple door edge guards may be arranged at varying heights along the length of railcar 100. For example, vehicle 202a may be a sedan and vehicle 202b may be a truck. Door edge guard 206 coupled to interior wall 204 adjacent vehicle 202a may be coupled at a first height consistent with a door height of sedan 202a, and door edge guard 206 coupled to interior wall 204 adjacent vehicle 202b may be coupled at a second height consistent with a door height of truck 202b. Guard strips 206 may be easily repositioned to accommodate various sized vehicles at various parking locations along the length of railcar 100.

The illustrated example includes four rows of door edge guards 206. Particular embodiments may include any suitable number of door edge guards 206 in any suitable configuration for the particular railcar configuration or vehicle loading.

Although the illustrated guards are referred to as door edge guards, the embodiments described herein are not limited to protecting vehicle doors from contacting the interior wall of the railcar, but may apply to protecting any object loaded within the railcar from contacting any portion of the railcar that may cause damage to the object.

In particular embodiments, door edge guards 206 are coupled to interior wall 204 with a protected magnetic fastening system. The protected magnetic fastening system protects the fastening system from causing damage to a vehicle if the vehicle contacts the fastening system of door edge guard 206. An example protected magnetic fastening system is illustrated in FIGS. 3A and 3B.

Figure 3A:
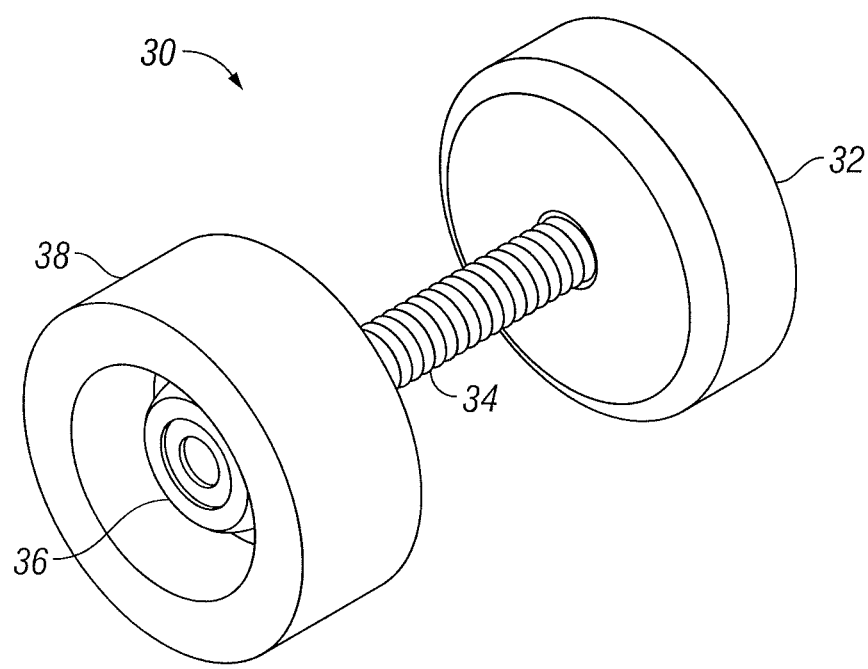
FIGS. 3A and 3B illustrate perspective views of a protected magnetic fastening system, according to a particular embodiment.
Figure 3B:
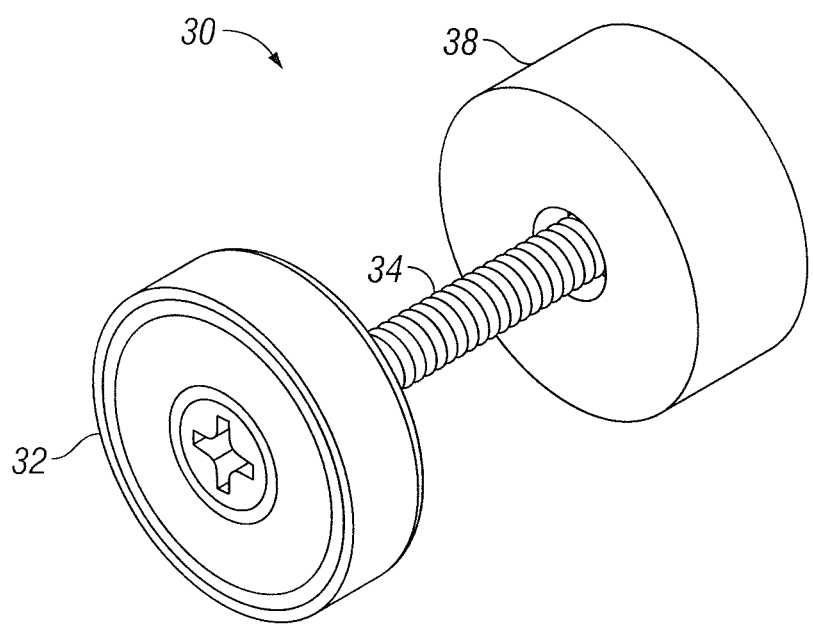

FIGS. 3A and 3B illustrate perspective views of a protected magnetic fastening system, according to a particular embodiment. In some embodiments, protected magnetic fastening system 30 uses a rod (e.g., a bolt) and a fastener (e.g., a lock nut) to attach a magnet to an item for fastening to a steel or other object. The rod is coupled to the magnet, the rod extends through the item, and the fastener couples the item to the magnet.

In particular embodiments, protected magnetic fastening system 30 includes magnet 32, rod 34, fastener 36, and cup washer 38. FIG. 3A illustrates the components of protected magnetic fastening system 30 from the opposite direction of FIG. 3B.

Magnet 32 is configured to magnetically couple to a metal surface, such as interior wall 204 of autorack railcar 100. Magnet 32 comprises a magnetic field strong enough to resist movement potentially caused by vibration or other forces applied to the railcar during normal operation, such as vibration of autorack railcar 100 while in transit and/or during loading and unloading.

A first end of rod 34 is coupled to magnet 32. In some embodiments, rod 34 may comprise a threaded stud coupled to magnet 32. In particular embodiments, rod 34 may comprise a bolt. Magnet 32 may include a center hole that accepts and retains bolt 34. The center hole in magnet 32 may be countersunk so that the head of bolt 34 is flush with an edge of magnet 32. Other embodiments may include any suitable coupling between magnet 32 and the first end of rod 34.

Fastener 36 is coupled to rod 34 at a second end, opposite the first end, and retains cup washer 38. In particular embodiments, fastener 36 may comprise any combination of nut, washer, lock-nut, cap-nut, wing-nut, cotter pin, etc. Fastener 36 and cup washer 38 may be used to couple an item to magnet 32.

Cup washer 38 at least partially surrounds fastener 36 and rod 34. In particular embodiments, cup washer 38 includes a recessed portion that accepts fastener 36 coupled to an end of rod 34. Cup washer 38 comprises plastic, foam, or any other suitable material that prevents or restricts metal or other rigid portions of protected magnetic fastening system 30 (e.g., fastener 36 and/or rod 34) from scratching or damaging objects around it. For example, cup washer 38 may prevent a vehicle door from contacting fastener 36 or rod 34 (or at least restrict contact to reduce damage, if not completely preventing). Although cup washer 38 is illustrated as disc-shaped with a recess for fastener 36, in other embodiments cup washer 38 may comprise any suitable shape for preventing contact with fastener 36.

In some embodiments, rod 34 may be oriented in the opposite direction than as illustrated in FIG. 3. For example, rod 34 may comprise a threaded bolt and magnet 32 may include a threaded center hole. The head of bolt 34 may comprise fastener 36 and the threaded end of bolt 34 may be screwed into the threaded center hole of magnet 32. Cup washer 38 may surround or partially surround the head of bolt 34.

In some embodiments, protected magnetic fastening system 30 may couple a door edge guard to an interior wall of an autorack railcar. An example door edge guard is illustrated in FIG. 4.

Figure 4:
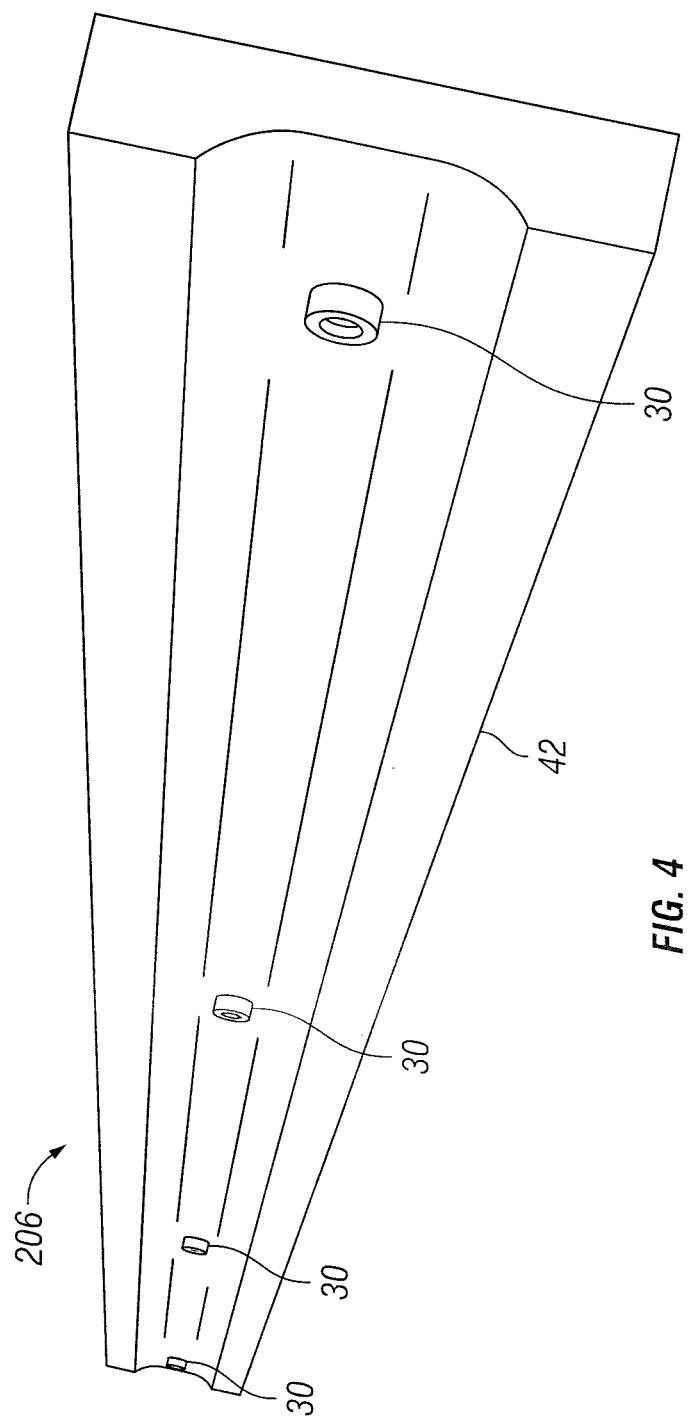
FIG. 4 illustrates a perspective view of an example door edge guard with protected magnetic fastening system, according to a particular embodiment.

FIG. 4 illustrates a perspective view of an example door edge guard with protected magnetic fastening system, according to a particular embodiment. Door edge guard 206 comprises guard strip 42 and one or more protected magnetic fastening systems 30. Protected magnetic fastening system 30 is configured to attach guard strip 42 to interior wall 204 of autorack railcar 100 using magnetic coupling. Guard strip 42 may include one or more protected magnetic fastening systems 30.

Guard strip 42 may comprise any suitable material (e.g., foam and/or plastic) and may be configured with any suitable shape. Guard strip 42 may deform to absorb energy from a vehicle door impact so that the door is not damaged by the impact. In other embodiments, guard strip 42 may deform to absorb energy from any object loaded within railcar 100 to prevent or reduce damage to the object.

In some embodiments, guard strip 42 may include a recessed or concave portion. Guard strip 42 may be coupled to interior wall 204 of autorack railcar 100 with fasteners positioned in the recessed or concave portion of guard strip 42, providing some protection an object contacting the fasteners. As guard strip 42 deforms to absorb energy, however, the object may still contact the fasteners. Thus, a protected magnetic fastening system provides protection even when the guard strip is compressed near the fastener.

In particular embodiments, guard strip 42 comprises a foam edge guard for an autorack railcar, such as autorack railcar 100. Protected magnetic fastening systems 30 are assembled through a hole in guard strip 42 and guard strip 42 is held in position inside autorack 100 using magnet 32 of protected magnetic fastening system 30. In particular embodiments, interior wall 204 of autorack railcar 100 comprises steel (or any other suitable ferromagnetic metals or alloys), which facilitates an operator easily and repeatedly moving door edge guard 206 as desired. The magnetic force is sufficient to prevent inadvertent movement of door edge guard 206 caused by vibration during transportation and/or loading/unloading of the autorack railcar.

Protected magnetic fastening systems 30 may be spaced (e.g., based on the strength of their magnetic fields to interior wall 204 of autorack railcar 100) to provide sufficient holding power to support door edge guard 206. Although a single row of protected magnetic fastening systems 30 is illustrated, particular embodiments may include any number of rows (or other suitable pattern) of protected magnetic fastening systems 30. In some embodiments, guard strip 42 may comprise a recessed or concave portion, and protected magnetic fastening systems 30 may be disposed within the recessed or concave portion of guard strip 42.

Door edge guard 206 may be arranged with any suitable length. For example, door edge guards 206 may be constructed in short lengths of a few feet or in one length that extends the entire length of autorack railcar 100, for example, eighty feet or more (e.g., eighty five feet or ninety or more feet). Door edge guards 206 with shorter lengths provide the flexibility to locate various sections at different heights and to accommodate differing vehicle sizes when autorack railcar 100 is loaded with a mix of different vehicles such as pickup trucks and small cars on the same deck. The flexibility of the design facilitates an operator molding door edge guards 206 around interior posts (e.g., as illustrated in FIG. 2) within autorack railcar 100 to provide up to 100% coverage of interior walls 204 of autorack railcar 100. Any combination of short length and long length door edge guards 206 may be used within autorack railcar 100.

Figure 5:
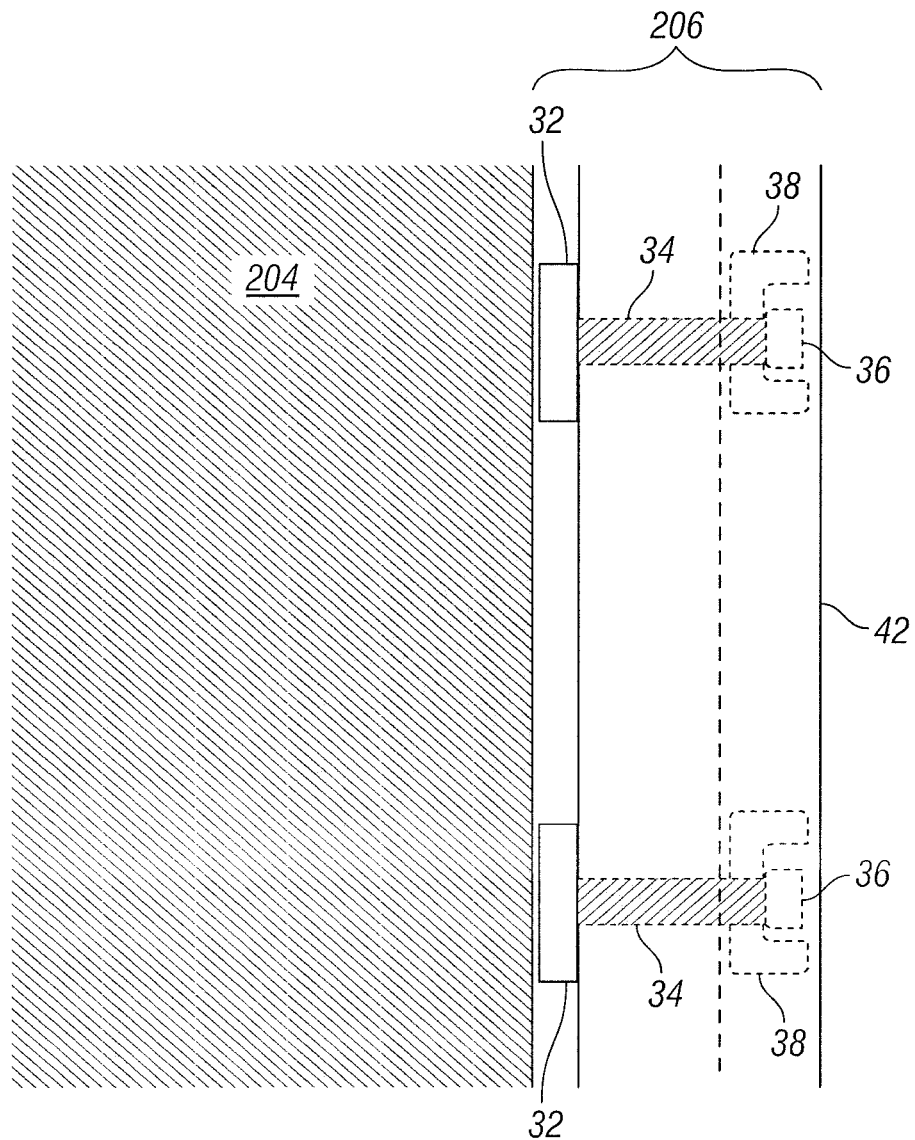
FIG. 5 is a sectional block diagram illustrating a top view of an example door edge guard with protected magnetic fastening system, according to a particular embodiment.

FIG. 5 is a sectional block diagram illustrating a top view of an example door edge guard with protected magnetic fastening system, according to a particular embodiment. For example, FIG. 5 illustrates a top-down sectional view of a portion of interior wall 204 and door edge guard 206 illustrated in FIG. 2.

Door edge guard 206 is magnetically coupled to interior wall 204. Door edge guard 206 comprises guard strip 42 coupled to interior wall 204 via one or more protected magnetic fastening systems (two are illustrated in FIG. 5) comprising magnet 32, rod 34, fastener 36, and cup washer 38. Rod 34 is coupled to magnet 32 (at a first end of rod 34) and a second end of rod 34 extends through guard strip 42. Fastener 36 and cup washer 38 secure guard strip 42 to a second end of rod 34, and magnet 32 couples guard strip 42 to interior wall 204.

When contacted by an object, such as a vehicle door, guard strip 42 may deform or compress to absorb the contact energy and prevent damage to the object. Without cup washer 38, the object may deform or compress guard strip 42 enough that the object might contact fastener 36 and/or the end of rod 34, which may damage the object. Cup washer 38 partially surrounds fastener 36 so that even if the object compresses guard strip 42, the object will contact cup washer 38, which comprises a protective material such as plastic or foam, instead of contacting fastener 36 or rod 34. Thus, guard strip 42 may be magnetically coupled and re-coupled to interior wall 204, which provides a rail operator enhanced flexibility, and the magnetic fastening system is also protected (i.e., via cup washer 38) so that the enhanced flexibility does not increase the risk of damage to objects in the railcar.

In the illustrated embodiment, magnet 32 results in a gap or space between interior wall 204 and guard strip 42. In other embodiments, magnet 32 may be recessed or countersunk into guard strip 42 so that guard strip 42 is flush against interior wall 204.

Although particular embodiments illustrate particular examples of rod 34, fastener 36, and/or cup washer 38, other embodiments may include other configurations. Some embodiments may include more or fewer components, and some come components may be integrated or separate. For example, in some embodiments, magnet 32 and rod 34 may comprise a single integrated component.

Particular embodiments include one or more magnets coupled to a guard strip. The magnets facilitate repositioning the guard strip within the railcar. The strength of the magnets prevent the guard strip from being bumped, vibrated, etc. from its intended position during normal railcar operation. The magnets are coupled to the guard strip so that the magnets remained coupled to the guard strip when a rail operator pulls (or pushes, twists, etc.) on the guard strip to decouple the guard strip from the railcar wall (or other surface such as ceiling, floor, etc.). Accordingly, particular embodiments include a rod that passes through the guard strip and is secured with any suitable form of fastener. Some fasteners may include further shielding, such as a cup washer or any other suitable shielding, to prevent the fastener from contacting objects loaded in the railcar.

Figure 6:
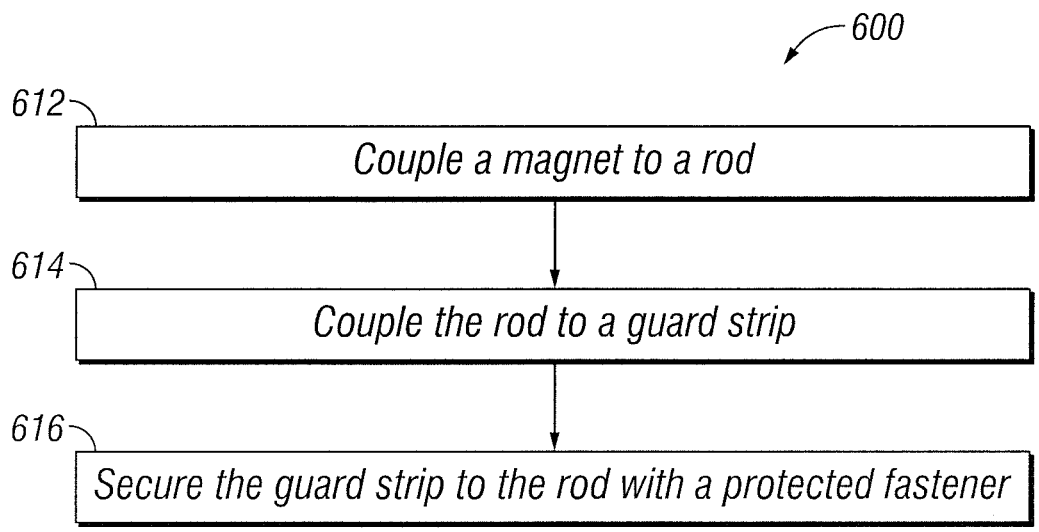
FIG. 6 is a flow diagram illustrating an example method of manufacturing a door edge guard, according to particular embodiments.

FIG. 6 is a flow diagram illustrating an example method of manufacturing a door edge guard, according to particular embodiments. In particular embodiments, one or more steps of method 600 may be performed using the components described with respect to FIGS. 1-5.

The method begins at step 612, where a magnet is coupled to a rod. For example, the rod may comprise a threaded stud and magnet 32 may be welded to the threaded stud, or the rod may comprise a bolt, and the bolt extends through a hole in magnet 32. Magnet 32 may be coupled to rod 34 according to any of the embodiments or examples described above. Some embodiments may include any suitable mechanical coupling.

At step 614, the rod is coupled to a guard strip. For example, rod 34 may be inserted through a hole in guard strip 42 according to any of the embodiments described above.

At step 616, the guard strip is secured to the rod via a protected fastener. For example, cup washer 38 may be secured to rod 34 with fastener 36 (nut, washer, lock-nut, cap-nut, wing nut, cotter pin, etc.) according to any of the embodiments described above. Other embodiments may secure the magnet and rod to the guard strip using any suitable mechanical coupling.

Modifications, additions, or omissions may be made to the method of FIG. 6. Additionally, one or more steps in method 600 of FIG. 6 may be performed in parallel or in any suitable order. The steps of method 600 may be repeated any suitable number of times to couple any suitable number of magnets to the guard strip.

Figure 7:
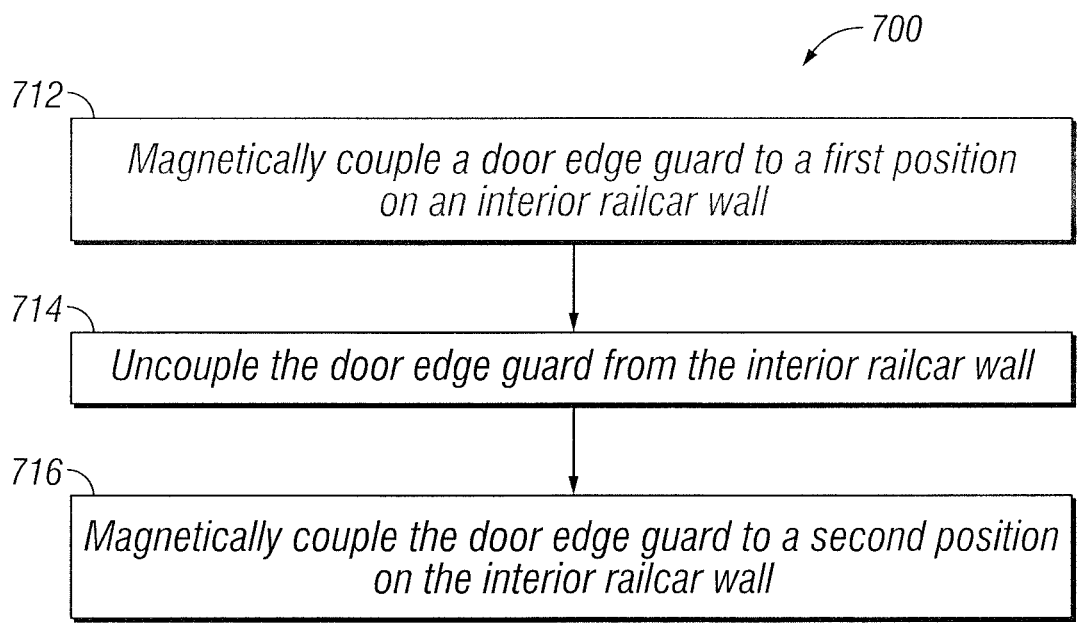
FIG. 7 is a flow diagram illustrating an example method of coupling a door edge guard to a railcar with a protected magnetic fastening system, according to particular embodiments.

FIG. 7 is a flow diagram illustrating an example method of coupling a door edge guard to a railcar with a protected magnetic fastening system, according to particular embodiments. In particular embodiments, one or more steps of method 700 may be performed using the components described with respect to FIGS. 1-5.

The method begins at step 712, where a door edge guard is magnetically coupled to a first position on an interior railcar wall. For example, an operator may magnetically couple door edge guard 206 to interior wall 204 of autorack railcar 100 via protected magnetic fastening systems 30.

At step 714, the door edge guard is uncoupled from the interior railcar wall. For example, an operator may apply a pulling force (or pushing, twisting, etc.) to door edge guard 206 sufficient to overcome the magnetic coupling between edge guard 206 and interior wall 204, thus removing door edge guard 206 from interior wall 204.

At step 716, the door edge guard is magnetically coupled to a second position on an interior railcar wall. For example, an operator may magnetically couple door edge guard 206 to a different location on interior wall 204 of autorack railcar 100 via protected magnetic fastening systems 30.

As a particular example, when an autorack deck is moved to a new location, an operator may pull door edge guards 206 away from interior wall 204 of autorack railcar 100 and reattach edge guards 206 in a new location. In particular embodiments, door edge guards 206 may be designed specific to autorack deck configuration and may be folded or rolled up and stored on autorack railcar 100 such that door edge guards 206 stay with autorack railcar 100 when autorack railcar 100 is converted between a Tri-level configuration and a Bi-level configuration. In such an example, the appropriate door edge guards 206 are readily available for attachment when autorack railcar 100 is later converted back to a previous configuration.

As another particular example, after unloading a load of vehicles of a first configuration (e.g., all sedans), an operator may reposition the door edge guards to accommodate a second configuration of vehicles (e.g., all trucks, or a combination of sedans and trucks).

Modifications, additions, or omissions may be made to the method of FIG. 7. Additionally, one or more steps in method 700 of FIG. 7 may be performed in parallel or in any suitable order. The steps of method 700 may be repeated any suitable number of times.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The invention claimed is:

1. A door edge guard comprising:
    a guard strip comprising a cushioning material for absorbing impact and one or more protected magnetic fastening systems;
    each of the one or more protected magnetic fastening systems comprising:
        a magnet;
        a rod comprising a first end and a second end, the first end coupled to the magnet, and the second end extending through the guard strip; and
        a cup washer coupled to the second end of the rod and secured with a fastener, the cup washer partially surrounding the fastener to restrict objects larger than the cup washer from contacting the fastener.

2. The door edge guard of claim 1, wherein the rod comprises a threaded rod and the fastener comprises a nut.

3. The door edge guard of claim 1, wherein the cup washer comprises a plastic cup washer.

4. The door edge guard of claim 1, wherein the guard strip comprises a recessed portion and the one or more protected magnetic fastening systems are disposed within the recessed portion.

5. The door edge guard of claim 1, wherein when the door edge guard is coupled to an interior of an autorack railcar, the door edge guard restricts a door of a vehicle loaded in the autorack railcar from contacting the interior of the autorack railcar when the door is opened.

* * * * *